United States Patent
Inoue et al.

(10) Patent No.: US 8,090,982 B2
(45) Date of Patent: Jan. 3, 2012

(54) MULTIPROCESSOR SYSTEM ENABLING CONTROLLING WITH SPECIFIC PROCESSOR UNDER ABNORMAL OPERATION AND CONTROL METHOD THEREOF

(75) Inventors: Takashi Inoue, Katsushika-ku (JP); Takeshi Inoguchi, Nagakute-cho (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 84 days.

(21) Appl. No.: 12/598,989

(22) PCT Filed: Jun. 11, 2008

(86) PCT No.: PCT/JP2008/060683
§ 371 (c)(1),
(2), (4) Date: Nov. 5, 2009

(87) PCT Pub. No.: WO2008/153057
PCT Pub. Date: Dec. 18, 2008

(65) Prior Publication Data
US 2010/0162042 A1 Jun. 24, 2010

(30) Foreign Application Priority Data
Jun. 11, 2007 (JP) ................................. 2007-154050

(51) Int. Cl.
G06F 11/00 (2006.01)
G06F 11/07 (2006.01)
(52) U.S. Cl. ............. 714/10; 714/13; 714/38.1; 714/40; 701/29
(58) Field of Classification Search ............. 714/13, 714/10, 38.1, 40; 701/29
See application file for complete search history.

(56) References Cited

U.S. PATENT DOCUMENTS

| 4,356,546 | A | * | 10/1982 | Whiteside et al. | 714/10 |
|---|---|---|---|---|---|
| 6,612,393 | B2 | * | 9/2003 | Bohner et al. | 180/405 |
| 6,990,320 | B2 | * | 1/2006 | LeCren | 455/67.11 |
| 7,493,515 | B2 | * | 2/2009 | Armstrong et al. | 714/10 |
| 7,502,674 | B2 | * | 3/2009 | Okude et al. | 701/36 |
| 2004/0221193 | A1 | * | 11/2004 | Armstrong et al. | 714/10 |
| 2006/0010344 | A1 | * | 1/2006 | Zorek et al. | 714/13 |
| 2006/0015773 | A1 | * | 1/2006 | Singh et al. | 714/13 |

(Continued)

FOREIGN PATENT DOCUMENTS
CN 1257244 A 6/2000
(Continued)

OTHER PUBLICATIONS

Office Action mailed Mar. 16, 2011 in CN Application No. 200810176459.1 & English translation thereof.

(Continued)

*Primary Examiner* — Scott Baderman
*Assistant Examiner* — Joseph Schell
(74) *Attorney, Agent, or Firm* — Kenyon & Kenyon LLP (57) ABSTRACT

A multiprocessor system is disclosed. The multiprocessor system includes plural processor cores to which control to be performed is allocated. The multiprocessor system includes a monitoring processor which detects an abnormal operation that has occurred in a specific processor core to which control having a higher priority order than control to be allocated to processor cores other than the specific processor core is allocated. When the monitoring processor detects the abnormal operation in the specific processor core, the monitoring processor allocates the control having the higher priority order to one of the processor cores other than the specific processor core.

4 Claims, 5 Drawing Sheets

U.S. PATENT DOCUMENTS

2008/0077943 A1* 3/2008 Pierce et al. .................. 719/329

FOREIGN PATENT DOCUMENTS

| JP | H4-24838 | 1/1992 |
| --- | --- | --- |
| JP | H4-223534 | 8/1992 |
| JP | 06-067916 A | 3/1994 |
| JP | H6-30069 | 4/1994 |
| JP | 07-175765 A | 7/1995 |
| JP | 2000-081991 A | 3/2000 |
| JP | 2001-506789 A | 5/2001 |
| JP | 2002-049405 A | 2/2002 |
| JP | 2002-259147 A | 9/2002 |
| JP | 2004-318498 A | 11/2004 |
| JP | 2006-155176 A | 6/2006 |
| JP | 2006-277278 A | 10/2006 |
| WO | 2007/009908 A1 | 9/2007 |

OTHER PUBLICATIONS

Office Action mailed Jun. 21, 2011 in CN Application No. 200880019342.0 & English translation thereof.

* cited by examiner

MULTIPROCESSOR SYSTEM ENABLING CONTROLLING WITH SPECIFIC PROCESSOR UNDER ABNORMAL OPERATION AND CONTROL METHOD THEREOF

This is a 371 national phase application of PCT/JP2008/060683 filed 11 Jun. 2008, which claims priority to Japanese Patent Application No. 2007-154050 filed 11 Jun. 2007, the contents of which are incorporated herein by reference.

TECHNICAL FIELD

The present invention relates to a multiprocessor system having plural processors to each of which control to be processed is allocated and a control method of the multiprocessor system.

BACKGROUND ART

As a conventional technology, a multiprocessor system formed of plural processors has been well-known (for example, see Patent Document 1). The multiprocessor system disclosed in Patent Document 1 provides three or more processors each of which has a normal mode and a monitoring mode. In the normal mode, a processor performs information processing by executing a program. In the monitoring mode, another processor executes a program which is the same program as the processor designated to perform in the normal mode executes, and the other processor compares a processing operation of its own with a processing operation of the processor designated to perform in the normal mode. When the processing operations are different from each other, the other processor generates an abnormal operation detection signal. In addition, one of the processors is designated to be operated in the normal mode, and the other processors are designated to be operated in the monitoring mode.

When one of the processors designated to be operated in the monitoring mode generates the abnormal operation detection signal, the processor designated to be operated in the normal mode is separated from the multiprocessor system, and one of the processors designated to be operated in the monitoring mode is designated to be operated in the normal mode and the remaining processors designated to be operated in the monitoring mode are determined as they are; with this, the multiprocessor system is restructured. On the other hand, when one of the processors designated to be operated in the monitoring mode generates the abnormal operation detection signal, the processor which generates the abnormal operation detection signal is separated from the multiprocessor system, the remaining processors are designated to be operated in the monitoring mode as they are, and the multiprocessor system is rebooted.

[Patent document 1] Japanese Patent Publication to Laid-Open to Public for Opposition No. H6-30069

However, in the above conventional technology, the processor designated to be operated in the normal mode and the processors designated to be operated in the monitoring mode must execute the same program. On the other hand, in another multiprocessor system in which control to be performed is allocated to each of the processors, the same program is not always executed in the processors. Since the same program is not executed in the processors, when the conventional technology is applied to the multiprocessor system, the conventional technology cannot handle an abnormal operation being generated in a processor. In addition, in the conventional multiprocessor system, when a processor to which important control is allocated generates an abnormal operation, a countermeasure is required so that the processor to which the important control is allocated is not separated from the multiprocessor system.

DISCLOSURE OF INVENTION

Problems to be Solved by the Invention

One object of the present invention is to solve one or more aforementioned problems and to provide a multiprocessor system and a control method of the multiprocessor system in which control allocated to a specific processor can be continuously performed even if an abnormal operation occurs in the specific processor, of processors to which control to be performed is allocated, respectively.

Means for Solving the Problems

An aspect of the present invention provides a multiprocessor system having plural processors to which processors control to be performed is allocated. The multiprocessor system includes an abnormal operation detecting unit which detects an abnormal operation that has occurred in a specific processor of the plural processors, and an instructing unit which instructs to change specific control allocated to the specific processor to be performed in a substitute processor which is one of the processors other than the specific processor based on a result detected by the abnormal operation detecting unit, and an abnormal operation diagnosing unit which diagnoses whether the abnormal operation occurs in hardware of the specific processor. When the abnormal operation is detected by the specific processor by the abnormal operation detecting unit, the specific control is performed by the substitute processor instructed by the instructing unit. In addition, when the abnormal operation is diagnosed to be not in the hardware of the specific processor by the abnormal operation diagnosing unit after the abnormal operation detecting unit has detected the abnormal operation of the specific processor, previous control which has been allocated to the substitute processor before the specific control is allocated to the substitute processor is performed by the specific processor by being allocated to the specific processor.

According to another aspect of the present invention, in the multiprocessor system, the instructing unit determines the substitute processor which performs the specific control corresponding to a predetermined priority order.

According to another aspect of the present invention, in the multiprocessor system, the predetermined priority order is determined by corresponding workloads to be processed by the processors other than the specific processor.

According to another aspect of the present invention, in the multiprocessor system, a change of a configuration of the previous control which has been allocated to the substitute processor before the specific control is allocated to the substitute processor is assigned to non-substitute processors whose control has not been changed to the specific control by the instructing unit.

According to another aspect of the present invention, in the multiprocessor system, the instructing unit instructs to change an OS and an application program to be executed on the OS.

According to another aspect of the present invention, in the multiprocessor system, the instructing unit instructs to change an OS for vehicle control allocated to the specific processor to one of the processors to which an OS for information control has been allocated.

According to another aspect of the present invention, in the multiprocessor system, the plural processors are processor cores in a multicore processor.

Another aspect of the present invention provides a control method of a multiprocessor system having plural processors to which processors control to be performed is allocated. The control method of the multiprocessor system includes an abnormal operation detecting step which detects an abnormal operation that has occurred in a specific processor of the plural processors, and a changing step which changes specific control allocated to the specific processor to be performed in a substitute processor which is one of the processors other than the specific processor when the abnormal operation is detected in the specific processor by the abnormal operation detecting step, and causes the substitute processor to perform the specific control, an abnormal operation diagnosing step which diagnoses whether the abnormal operation occurs in hardware of the specific processor, and an allocating step which allocates previous control which has been allocated to the substitute processor before the specific control is allocated to the substitute processor is performed by the specific processor by being allocated to the specific processor, when the abnormal operation is diagnosed to be not in the hardware of the specific processor by the abnormal operation diagnosing step after the abnormal operation detecting step has detected the abnormal operation of the specific processor.

According to another aspect of the present invention, in the control method of the multiprocessor system, a change of the configuration of the previous control which has been allocated to the substitute processor before the processor to which the specific control is to be allocated is determined corresponding to a predetermined priority order in the changing step.

According to another aspect of the present invention, in the control method of the multiprocessor system, the predetermined priority order is determined by corresponding workloads to be processed by the processors other than the specific processor.

According to another aspect of the present invention, in the control method of the multiprocessor system, a change of a configuration of the previous control which has been allocated to the substitute processor before the specific control is allocated to the substitute processor is instructed to non-substitute processors whose control has not been changed to the specific control by the changing step.

According to another aspect of the present invention, in the control method of the multiprocessor system, the changing step changes an OS and an application program to be executed on the OS.

According to another aspect of the present invention, in the control method of the multiprocessor system, the changing step changes an OS for vehicle control allocated to the specific processor to one of the processors to which an OS for information control has been allocated.

According to another aspect of the present invention, in the control method of the multiprocessor system, the plural processors are processor cores in a multicore processor.

According to another aspect of the present invention, in the multiprocessor system, when the abnormal operation detecting unit detects the abnormal operation of the specific processor and the specific control is performed by the substitute processor, the previous control which has been allocated to the substitute processor is performed by non-substitute processors to which the specific control has not been allocated by the instructing unit.

According to another aspect of the present invention, in the multiprocessor system, when the abnormal operation is diagnosed to be not in the hardware of the specific processor by the abnormal operation diagnosing unit after the abnormal operation detecting unit has detected the abnormal operation of the specific processor, the previous control which has been allocated to the substitute processor before the specific control is allocated to the substitute processor is allocated to the specific processor from the non-substitute processors.

According to another aspect of the present invention, in the control method of the multiprocessor system, when the abnormal operation detecting step detects the abnormal operation of the specific processor and the specific control is performed by the substitute processor, the previous control which has been allocated to the substitute processor is performed by non-substitute processors to which the specific control has not been allocated by the changing step.

According to another aspect of the present invention, in the control method of the multiprocessor system, when the abnormal operation is diagnosed to be not in the hardware of the specific processor by the abnormal operation diagnosing step after the abnormal operation detecting step has detected the abnormal operation of the specific processor, the previous control which has been allocated to the substitute processor before the specific control is allocated to the substitute processor is allocated to the specific processor from the non-substitute processors.

ADVANTAGEOUS EFFECT OF THE INVENTION

An embodiment of the present invention provides a multiprocessor system having plural processors to each of which control to be performed is allocated. In the multiprocessor system, when an abnormal operation occurs in a specific processor, control allocated to the specific processor is continuously performed by a processor other than the specific processor.

EXPLANATION OF REFERENCES 0, 1, 2, and 3 Processor core
10 Multicore processor
30 Storage unit
40 Communication device
50 Information management center
100 and 200 Multicore system

BEST MODE FOR CARRYING OUT THE INVENTION

The best mode for carrying out the invention is described with reference to the accompanying drawings.

Figure 1:
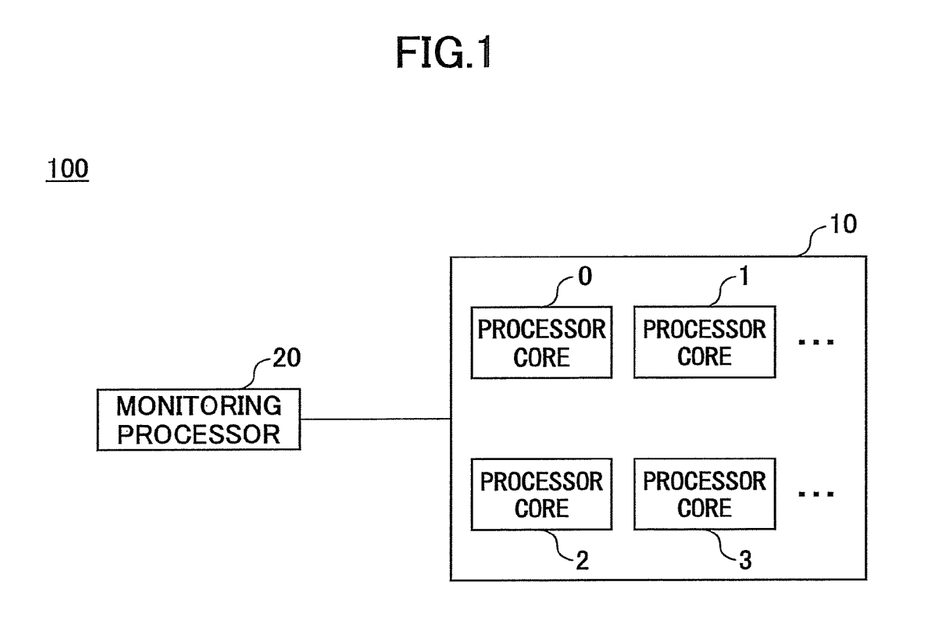
FIG. 1 is a block diagram showing a multicore system of a multiprocessor system according to an embodiment of the present invention.

FIG. 1 is a block diagram showing a multicore system 100 of a multiprocessor system according to an embodiment of the present invention. That is, the multicore system 100 is one of the multiprocessor systems. The multicore system 100 includes a multicore processor 10 having plural processor cores. The multicore processor 10 includes, for example, four processor cores 0, 1, 2, and 3 as shown in FIG. 1. Each of the processor cores 0, 1, 2, and 3 processes programs such as an OS (operating system) and an application program which is operated on the OS independently or by working together with each other. When an interrupt which instructs to execute a program is generated, each of the processor cores 0, 1, 2, and 3 loads the program in, for example, a RAM (working area) (not shown) from a storage unit (not shown), for example, a ROM or a hard disk, and executes the program. In FIG. 1, the processor cores 0, 1, 2, and 3 can be processors themselves.

Control to be performed is allocated to each of the processor cores 0, 1, 2, and 3. In addition, the control to be performed by each of the processor cores 0, 1, 2, and 3 has a priority order in the multicore system 100. Control having a highest priority order (highest priority control) is allocated to at least one of the processor cores 0, 1, 2, and 3, and control whose priority order is lower than the highest priority control is allocated to the other processor cores.

For example, when the multicore system 100 is applied to a vehicle system, vehicle control having the highest priority order is allocated to the processor core 0, and information control having a priority order lower than the highest priority order is allocated to each of the processor cores 1, 2, and 3. The information control to be allocated to the processor cores 1, 2, and 3 can have different priority orders.

The vehicle control includes main control which controls basic operating functions of a vehicle, for example, a driving function, a turning function, and a stopping function of the vehicle and support control relating to the main control. Specifically, as examples of the vehicle control, there are engine control for controlling an engine of the vehicle, steering wheel control for controlling a steering wheel of the vehicle, braking control for controlling a brake of the vehicle, and the supporting control to support the above control.

On the other hand, the information control is additional control which controls additional functions of the vehicle other than the basic operating functions of the vehicle. Specifically, as examples of the information control, there are navigation control for controlling a navigation device, audio visual control for controlling an audio device and a visual device, and communication control for controlling communications with an external device.

Each of the processor cores 0, 1, 2, and 3 executes programs such as the OS and an application program which is operated on the OS for realizing the vehicle control and the information control, independently or by working together with each other. As specific examples of the OS to be processed by the processor cores 0, 1, 2, and 3, there are a real time OS (RT-OS) as the OS for the vehicle control, and a multimedia OS (MM-OS) as the OS for the information control.

The RT-OS is excellent in batch processing and a TSS (time sharing system) because processes are to be executed in real time. In the application program for the vehicle control, a predetermined process must be executed in real time so that high responsiveness and high safety are secured. Therefore, it is preferable that the RT-OS be used for the vehicle control since the RT-OS can process the program in real time. As examples of the RT-OS, there are OSEC, ITRON, and so on.

The MM-OS is excellent in multimedia processing compared with the RT-OS. The multimedia processing includes, for example, compression and expansion processing of codes of MPEG, user interface processing by GUI (graphical user interface), and Internet connecting processing including security management. Therefore, it is preferable that the MM-OS be used for the information control since the MM-OS can realize the multimedia processing requested to be performed. As examples of the MM-OS, there are Linux (trademark), QNX (trademark), and so on.

Returning to FIG. 1, the multicore system 100 further includes a monitoring processor 20 independent from the multicore processor 10. The monitoring processor 20 is used as an abnormal operation detecting unit which detects an abnormal operation of a processor core to which the vehicle control (the highest priority control) is allocated. The monitoring processor 20 can be a single core processor or a multicore processor. For example, when the vehicle control is allocated to the processor core 0, the monitoring processor 20 detects an abnormal operation having occurred in hardware or software of the processor core 0. In addition, the monitoring processor 20 can detect an abnormal operation having occurred in hardware or software of the processor cores 1, 2, and 3.

A processor core in the monitoring processor 20 detects an abnormal operation of the processor core 0 by, for example, communications with the processor core 0. The monitoring processor 20 can monitor whether the processor core 0 itself and a program being executed by the processor core 0 are normally operating when the monitoring processor 20 periodically communicates with the processor core 0. Alternatively, the monitoring processor 20 can detect the abnormal operation of the processor core 0 by receiving a signal indicating the abnormal operation of the processor core 0 or can detect the abnormal operation of the processor core 0 by detecting a watch dog pulse from the processor core 0.

The monitoring processor 20 can be included in an electronic control device which provides the multicore processor 10, or can be included in another electronic control device which does not provide the multicore processor 10.

Figure 2:
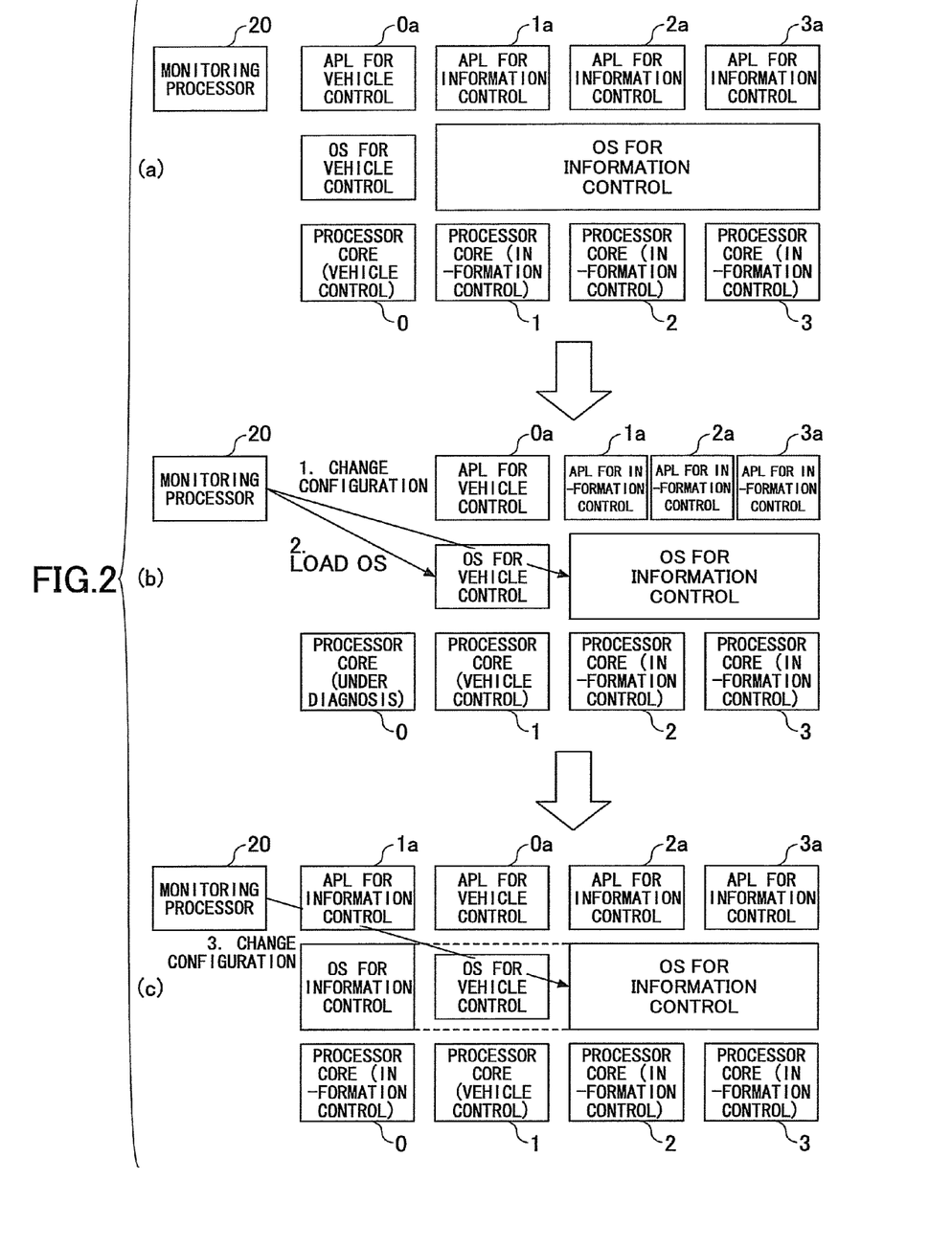
FIG. 2 is a schematic diagram showing an operation flow when a monitoring processor detects an abnormal operation of a processor core in the multicore system shown in FIG. 1.

FIG. 2 is a schematic diagram showing an operation flow when the monitoring processor 20 detects an abnormal operation of the processor core 0 in the multicore system 100. In FIG. 2, control allocated to each of the processor cores 0, 1, 2, and 3 is also shown.

FIG. 2(a) shows a status before an abnormal operation occurs in the processor core 0. In FIG. 2(a), the processor core 0 executes an APL (application program) 0a for vehicle control by operating an OS for vehicle control. The processor cores 1, 2, and 3 execute corresponding APLs 1a, 2a, and 3a for information control by operating OSs for information control, respectively.

When an abnormal operation occurs in the processor core 0 to which the vehicle control (the highest priority control) is allocated, as shown in FIG. 2(b), the monitoring processor 20 having detected the abnormal operation instructs to change a configuration of the OS for information control by rewriting a registry and a related file so that the OS for information control operating on the three processor cores 1, 2, and 3 is operated on the two processor cores 2 and 3. That is, the monitoring processor 20 operates as an instructing unit. In addition, the monitoring processor 20 instructs to change the OS of the processor core 1 from the OS for information control to the OS for vehicle control so that the process by the ALP 0a for vehicle control being executed by the processor core 0 in which the abnormal operation has been detected is continued by the processor core 1.

That is, the monitoring processor 20 loads the OS for vehicle control on the processor core 1 and causes the processor core 1 to boot the OS for vehicle control, and causes the processor core 1 to execute the APL 0a for vehicle control on the OS for vehicle control.

The APL 1a for information control which has been executed by the processor core 1 is executed on the OS for information control by the processor cores 2 and 3 with the execution of the APLs 2a and 3a for information control by the processor cores 2 and 3. In this case, the processor core 1 operates as a substitute processor core for the processor core 0 to perform the vehicle control.

The monitoring processor 20 diagnoses the abnormal operation of the processor core 0, and when the abnormal operation is not in hardware of the processor core 0, as shown in FIG. 2(c), the monitoring processor 20 instructs to change the configuration of the OS for information control so that the OS for information control being operated on the two processor cores 2 and 3 is operated on the three processor cores 0, 2, and 3. That is, the monitoring processor 20 loads the OS for information control on the processor core 0 and causes the processor core 0 to boot the OS for information control so that the process by the APL 1a for information control being executed by the processor cores 2 and 3 is continued by the processor core 0. That is, the monitoring processor 20 operates as an abnormal operation diagnosing unit.

Figure 3:
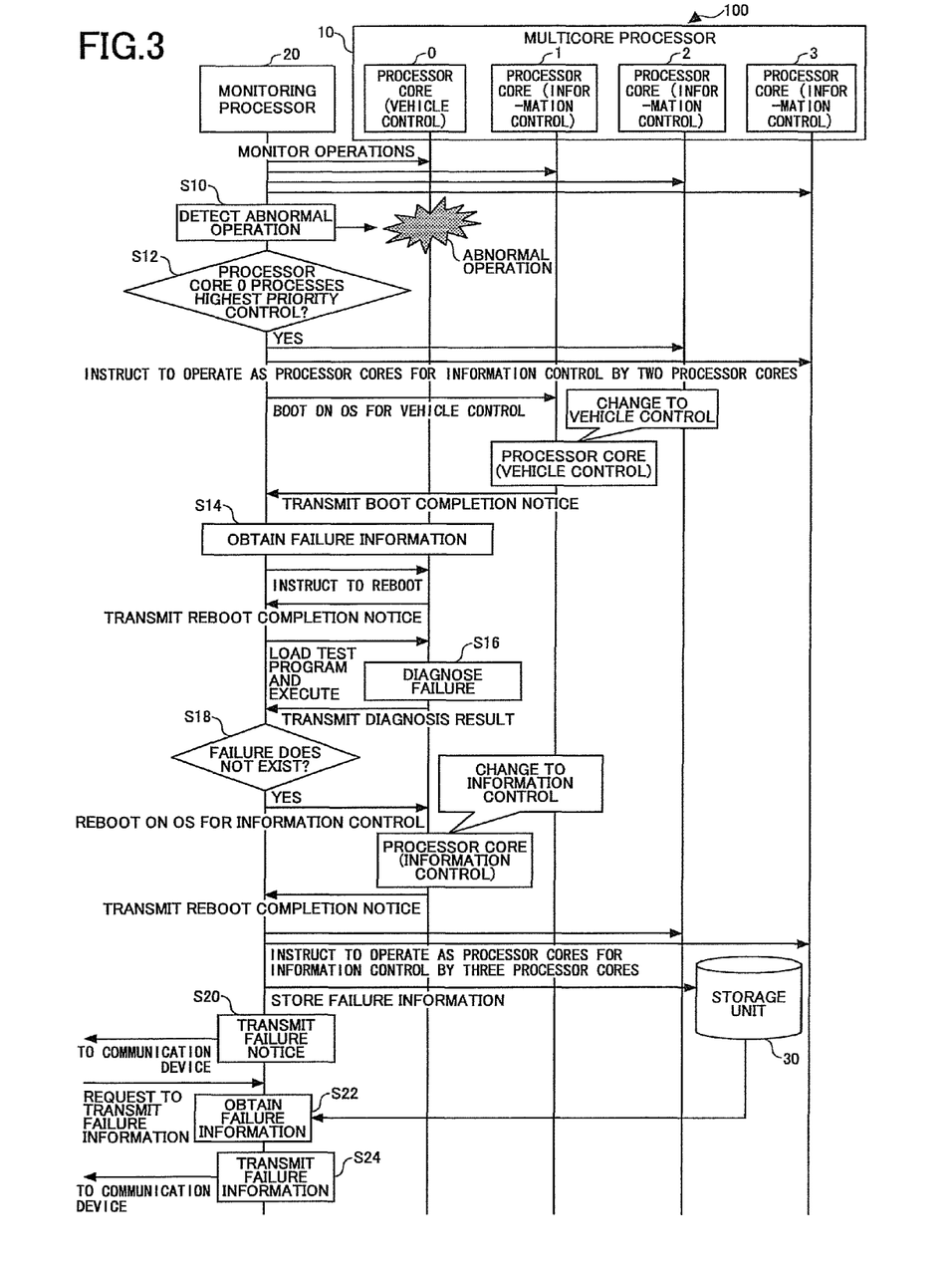
FIG. 3 is a sequence chart showing operations in the multicore system when a processor core whose operation has been detected to be abnormal is diagnosed to be normal in hardware.
Figure 4:
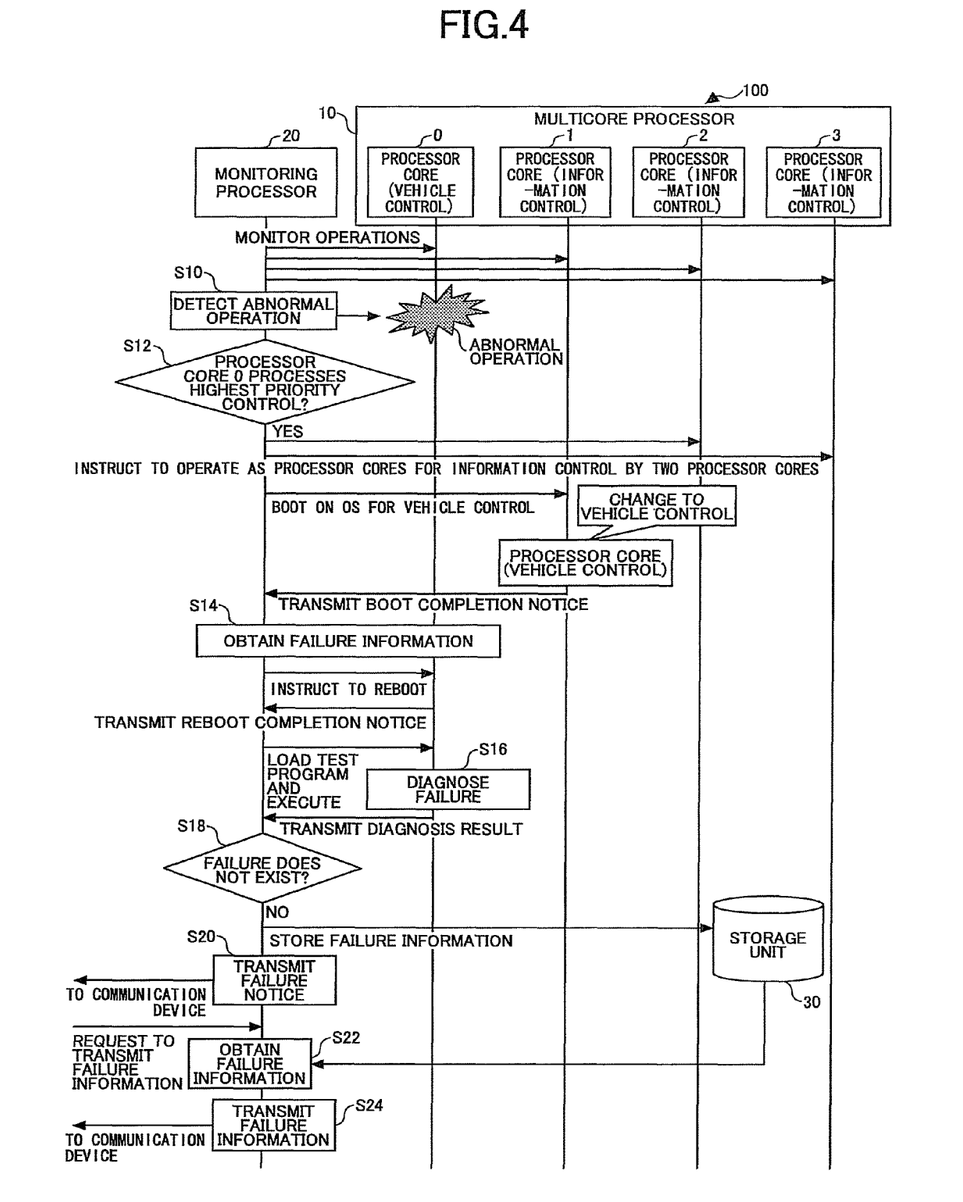
FIG. 4 is a sequence chart showing operations in the multicore system when a processor core whose operation has been detected to be abnormal is diagnosed to be abnormal in hardware.

Next, referring to FIGS. 3 and 4, detailed operations in the multicore system 100 are described when the monitoring processor 20 detects an abnormal operation of the processor core 0.

FIG. 3 is a sequence chart showing operations in the multicore system 100 when a processor core whose operation has been detected to be abnormal is diagnosed to be normal in hardware. In FIG. 3, as an example, it is determined that the processor core 0 is used for vehicle control and the processor cores 1, 2, and 3 are used for information control in the initial stage.

The monitoring processor 20 monitors an operation of each of the processor cores 0, 1, 2, and 3 by communications with the processor cores 0, 1, 2, and 3. When an abnormal operation occurs in the processor core 0, the monitoring processor 20 detects the abnormal operation (S10), and the monitoring processor 20 determines whether the processor core 0 processes highest priority control (vehicle control) (S12). Since the processor core 0 processes the highest priority control (YES in S12), the monitoring processor 20 instructs the three processor cores 1, 2, and 3 with a predetermined priority order to change a configuration in which one of the three cores being operated as the processor cores for information control is changed to operate as a processor core for vehicle control and the remaining two processor cores are operated as processor cores for information control. In this case, one of the processor cores is the processor core 1 and the remaining two processor cores are the processor cores 2 and 3.

The priority order can be determined beforehand to be attached to the processor cores, or can be determined corresponding to processing workloads in the processor cores. For example, when the priority order is determined corresponding to the processing workloads, a processor core having a lowest workload is determined to be a processor core for vehicle control, and the remaining processor cores are determined to be operated as processor cores for information control.

In addition, the monitoring processor 20 instructs the processor core 1 to boot the OS for vehicle control.

The processor core 1 which has received the instruction loads the OS for vehicle control in a RAM (not shown) from a storage unit such as a ROM (not shown), completes default settings such as initialization of a storage unit (not shown), and transmits a boot completion notice to the monitoring processor 20. With this, the ALP for vehicle control which has been executing on the OS for vehicle control of the processor core 0 can continue to be executed on the OS for vehicle control of the processor core 1.

Next, the monitoring processor 20 which has detected the abnormal operation of the processor core 0 obtains failure information effective to analyze a cause of the abnormal operation of the processor core 0, for example, information in a register (S14). The monitoring processor 20 instructs to reboot the processor core 0, and when the reboot has been completed, the processor core 0 transmits a reboot completion notice to the monitoring processor 20. The monitoring processor 20 which has received the failure information loads a test program capable of diagnosing a failure of hardware of the processor core 0 and diagnoses the failure of the processor core 0 by starting up the test program (S16). As long as the test program is suitable to diagnose the failure of the hardware of the processor core 0, the test program is not limited to a specific program.

The monitoring processor 20 determines whether a failure exists in the hardware of the processor core 0 based on a diagnosis result (S18). When a failure does not exist in the hardware of the processor core 0 (YES in S18), the monitoring processor 20 assumes that the abnormal operation has temporarily occurred for some reasons such as noise and a resetting operation, determines that the processor core 0 can perform a process, and instructs the processor core 0 to reboot on the OS for information control. The processor core 0 which has received the instruction loads the OS for information control in a RAM (not shown) from a storage unit such as a ROM (not shown), completes default settings such as initialization of a storage unit (not shown), and transmits a reboot completion notice to the monitoring processor 20. With this, the ALP for information control which has been executing on the OS for information control of the processor core 1 can continue to be executed on the OS for information control of the processor core 0.

The monitoring processor 20 which has received the reboot completion notice from the processor core 0 instructs the processor cores 2 and 3 to change the configuration so that the OS for information control is performed by the processor cores 0, 2, and 3. In addition, the monitoring processor 20 stores the failure information obtained in S14 in a storage unit 30. An operation flow after storing the failure information in the storage unit 30 is described below.

FIG. 4 is a sequence chart showing operations in the multicore system 100 when a processor core whose operation has been detected to be abnormal is diagnosed to be abnormal in hardware. In FIG. 4, similar to FIG. 3, it is determined that the processor core 0 is used for vehicle control and the processor cores 1, 2, and 3 are used for information control in the initial stage. In FIG. 4, since the operations from S10 through S16 are the same as the operations described in FIG. 3, the same description is omitted.

When the monitoring processor 20 determines that a failure exists in the hardware of the processor core 0 based on the diagnosis result (NO in S18), the monitoring processor 20 determines that the abnormal operation of the processor core 0 is difficult to be recovered and stores the failure information obtained in S14 in the storage unit 30. Therefore, even if the processor core 0 in which the abnormal operation has been detected cannot be recovered, the ALP for vehicle control which has being executing on the processor core 0 can be continued on the OS for vehicle control by the processor core 1.

As described above, according to the embodiment of the present invention, even if an abnormal operation is detected in a processor core which processes vehicle control, the vehicle control can be changed to be processed by a processor core for information control. With this, the vehicle control having a higher priority than the information control can be continuously performed and the multicore system 100 can safely maintain the operation.

Next, an operation is described in which the failure information is stored in the storage unit 30.

Figure 5:
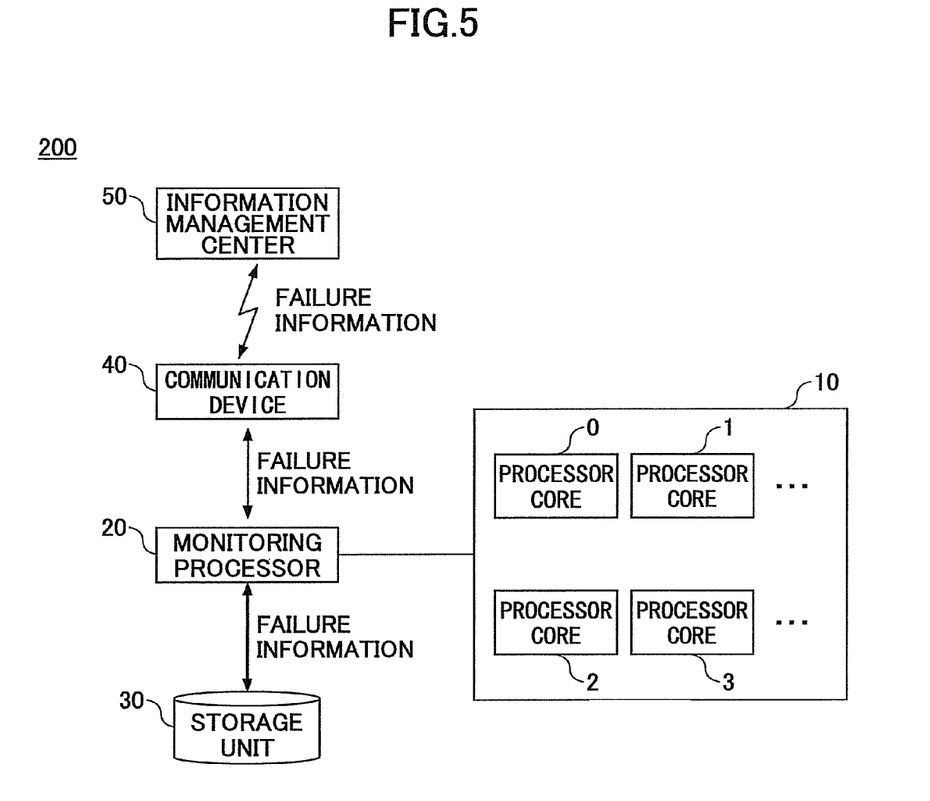
FIG. 5 is a block diagram showing another multicore system of the multiprocessor system according to the embodiment of the present invention.

FIG. 5 is a block diagram showing a multicore system 200 of the multiprocessor system according to the embodiment of the present invention. The multicore system 200 is a modified example of the multicore system 100 shown in FIG. 1. In FIG. 5, when an element has a function similar to a function of an element shown in FIGS. 1 and 3, the same reference number as that shown in FIGS. 1 and 3 is used for the element.

In FIG. 5, when the monitoring processor 20 detects an abnormal operation of a processor core, the monitoring processor 20 stores failure information of the processor core in the storage unit 30 as abnormal history. When the multicore system 200 refers to the failure information stored in the storage unit 30, the cause of the abnormal operation of a processor core can likely be analyzed. In addition, when a communication device 40 is formed in which the failure information can be transmitted and received via a wireless or a wired network and an analyzing section (for example, an information management center 50) is formed in which the failure information is analyzed, even if the monitoring processor 20 is at a position separated from the information management center 50, the monitoring processor 20 can easily obtain analysis information from the information management center 50 via the communication device 40.

When FIGS. 3, 4, and 5 are referred to, the monitoring processor 20 stores the failure information in the storage unit 30 obtained in S14, and also transmits a failure notice for reporting the abnormal operation occurrence in the processor core 0 to the information management center 50 via the communication device 40 (S20). The information management center 50 receives the failure notice and requests the monitoring processor 20 to transmit the failure information to the information management center 50. The monitoring processor 20 receives the request, obtains the failure information stored in the storage unit 30 (S22), and transmits the failure information to the information management center 50 via the communication device 40 (S24).

In the embodiment of the present invention, the multicore processor 10 includes the four processor cores 0 through 3. However, the number of the processor cores in the multicore processor 10 is not limited to four. In addition, in the embodiment of the present invention, the processor cores 0 through 3 are built-in processor cores in the multicore processor 10. However, the processor cores 0 through 3 can be single core processors capable of communicating with each other.

In addition, in the embodiment of the present invention, one processor core is used for vehicle control; however, two or more processor cores can be used for vehicle control for executing the APL for vehicle control on the OS for vehicle control. In this case, when an abnormal operation is detected in one of the two or more processor cores for vehicle control, the APL for vehicle control which has been executing on one of the processor cores for vehicle control can be executed by the other processor cores for vehicle control other than the one processor core for vehicle control in which the abnormal operation has been detected, or can be executed by a processor core for information control by changing the processor core for information control to a processor core for vehicle control.

Further, the present invention is not limited to the specifically disclosed embodiment, and variations and modifications may be made without departing from the scope of the present invention.

The present invention is based on Japanese Priority Patent Application No. 2007-154050 filed on Jun. 11, 2007, the entire contents of which are hereby incorporated herein by reference.

The invention claimed is:

1. A multiprocessor system having a plurality of processors to which control to be performed is allocated, comprising:
    an abnormal operation detecting unit which detects an abnormal operation that has occurred in a specific processor of the plural processors;
    an instructing unit to change a specific control allocated to the specific processor to be performed in a substitute processor which is one of the processors other than the specific processor based on a result detected by the abnormal operation detecting unit; and
    an abnormal operation diagnosing unit which diagnoses whether the abnormal operation occurs in hardware of the specific processor; wherein
    if the abnormal operation is detected in the specific processor by the abnormal operation detecting unit, the specific control is performed by the substitute processor, and
    if the abnormal operation is diagnosed to not be in the hardware of the specific processor by the abnormal operation diagnosing unit, a previous control, which has been allocated to the substitute processor, is allocated to be performed by the specific processor, and
    wherein the instructing unit changes an OS and an application program to be executed on the OS, and
    wherein the instructing unit changes an OS for vehicle control allocated to the specific processor to one of the processors to which an OS for information control has been allocated.

2. The multiprocessor system as claimed in claim 1, wherein:
    the plural processors are processor cores in a multi-core processor.

3. A control method of a multiprocessor system having a plurality of processors to which processors control to be performed is allocated, comprising:
    an abnormal operation detecting step which detects an abnormal operation that has occurred in a specific processor of the plural processors;
    a changing step which changes a specific control allocated to the specific processor to be performed in a substitute processor the substitute processor being one of the processors other than the specific processor, and causes the substitute processor to perform the specific control;
    an abnormal operation diagnosing step which diagnoses whether the abnormal operation occurs in hardware of the specific processor; and
    an allocating step which allocates a previous control, which has been allocated to the substitute processor before the specific control is allocated to the substitute processor, to be performed by the specific processor if the abnormal operation is diagnosed to not be in the hardware of the specific processor by the abnormal operation diagnosing step, wherein the changing step changes an OS and an application program to be executed on the OS, and wherein the changing step changes an OS for vehicle control allocated to the specific processor to one of the processors to which an OS for information control has been allocated.

4. The control method of the multiprocessor system as claimed in claim 3, wherein:

the plural processors are processor cores in a multi-core processor.

\* \* \* \* \*